US006914346B2

(12) United States Patent
Girard

(10) Patent No.: US 6,914,346 B2
(45) Date of Patent: Jul. 5, 2005

(54) AUTOMOBILE VEHICLE DOOR LOCKING ASSEMBLY AND PROCESS FOR TESTING CORRECT OPERATION OF A LOCK MODULE OF THIS ASSEMBLY

(75) Inventor: Raphaël Girard, Loiron (FR)

(73) Assignee: Valeo Securite Habitacle, Creteil (FR)

( * ) Notice: Subject to any disclaimer, the term of this patent is extended or adjusted under 35 U.S.C. 154(b) by 425 days.

(21) Appl. No.: 09/797,875

(22) Filed: Mar. 5, 2001

(65) Prior Publication Data

US 2001/0019227 A1 Sep. 6, 2001

(30) Foreign Application Priority Data

Mar. 3, 2000 (FR) ........................................... 00 02731

(51) Int. Cl.$^{7}$ .................................................. B60L 1/00
(52) U.S. Cl. ...................................... 307/10.1; 307/9.1
(58) Field of Search .......................... 361/760; 700/26; 320/117, 121; 307/64, 66, 10.1; 70/237, 255, 256, 257; 180/289

(56) References Cited

U.S. PATENT DOCUMENTS

| | | | | | |
|---|---|---|---|---|---|
| 4,603,894 A | * | 8/1986 | Osenkowski | ................ | 292/216 |
| 4,617,812 A | | 10/1986 | Rogers | | |
| 5,086,557 A | * | 2/1992 | Hyatt, Jr. | .................... | 361/792 |
| 5,151,848 A | * | 9/1992 | Finello | ....................... | 361/502 |
| 5,226,259 A | * | 7/1993 | Yamagata et al. | ............ | 49/502 |
| 5,497,641 A | * | 3/1996 | Linde et al. | .................. | 70/257 |
| 5,552,641 A | * | 9/1996 | Fischer et al. | .............. | 180/287 |
| 5,669,685 A | * | 9/1997 | Kotani et al. | ................. | 353/28 |
| 5,736,793 A | * | 4/1998 | Jahrsetz et al. | ............ | 307/10.1 |
| 5,896,026 A | * | 4/1999 | Higgins | ...................... | 320/166 |
| 5,898,291 A | * | 4/1999 | Hall | ........................... | 320/121 |
| 6,056,076 A | * | 5/2000 | Bartel et al. | ................ | 180/287 |
| 6,430,692 B1 | * | 8/2002 | Kimble et al. | .............. | 320/121 |

FOREIGN PATENT DOCUMENTS

| | | | | |
|---|---|---|---|---|
| EP | 0694664 | | 1/1996 | |
| EP | 0856625 | | 8/1998 | |
| FR | 2759108 | | 8/1998 | |
| FR | 2763627 | | 11/1998 | |
| JP | 08-100554 | * | 4/1996 | ........... E05B/65/20 |
| WO | 9800319 | | 1/1998 | |

OTHER PUBLICATIONS

Shimshon Gotterfeld, "Ultracapacitors, Imagining the Future of Power", Dateline Los Alamos, Jun–Jul. 1999, pp. 1–4.*

Siemens Matsushita Components GmgH Co., UltraCap B49100 Datasheet, May 1999.*

Montena, BOOSTCAP Ultracapacitor BCAP0010 Datasheet, Feb. 2000.*

Schneuwly et al., "Properties and applications of supercapacitors from the state–of–the–art to future trends", 2000, Proceedings PCIM 2000, pp. 1–10.*

Andrew Burke, "Ultracapacitors: Why, How, and Where is the Technology", Institute of Transportation Studies, University of California, 2000.*

* cited by examiner

*Primary Examiner*—Robert L. Deberadinis
(74) *Attorney, Agent, or Firm*—Liniak, Berenato & White

(57) ABSTRACT

An automobile vehicle door locking assembly, intended to be fitted in a vehicle door, of the type including an electric lock module incorporating, first, an electronic board providing an interface connecting the lock module to a main electrical power supply and to a control of said lock module, and, secondly, back-up electrical power supply to supply the lock module in the event of a malfunction of the main electrical power supply, wherein the back-up electrical power supply include at least one electronic energy-storage component mounted on the electronic board, this component preferably being a supercapacitor.

9 Claims, 2 Drawing Sheets

AUTOMOBILE VEHICLE DOOR LOCKING ASSEMBLY AND PROCESS FOR TESTING CORRECT OPERATION OF A LOCK MODULE OF THIS ASSEMBLY

BACKGROUND OF THE INVENTION

The invention relates to an automobile vehicle door locking assembly and a process for testing correct operation of a lock module of this assembly.

DESCRIPTION OF THE PRIOR ART

In the present state of the art, there are various known types of automobile vehicle door locking assemblies designed to be fitted in a vehicle door. One type, notably as described in EP-A-0 694 664, includes an electric lock module equipped with an electronic board providing an interface connecting this lock module to main electrical power supply means, to means of control of the lock module, and to back-up electrical power supply means that are used only in the event of a malfunction of the main electrical power supply means.

In the aforementioned document, the back-up means are constituted by a battery incorporated in the electric lock module. This battery, separated from the electronic board, is mounted for example in a compartment of the lock module. The battery is connected to the electronic board by electrical connection means generally including conducting tracks or wires. These connection means are exposed to various risks, such as short-circuit, disconnection, oxidation, variation of resistance, etc., that reduce the reliability of the back-up power supply means.

In addition, the electrical current supplied by the batteries traditionally used for back-up power supply is insufficient for certain applications requiring a current of 3 Amp or more.

SUMMARY OF THE INVENTION

The purpose of the present invention is to enhance the reliability of the back-up power supply means incorporated in the electric lock module, while enabling these back-up means to deliver a relatively large current.

For this purpose, the object of the invention is an automobile vehicle door locking assembly, intended to be fitted in a vehicle door, of the type including an electric lock module incorporating, first, an electronic board providing an interface connecting said lock module to main electrical power supply means and to means of control of said lock module, and, secondly, back-up electrical power supply means to supply said lock module in the event of a malfunction of said main electrical power supply means, wherein said back-up electrical power supply means include at least one electronic energy-storage component mounted on said electronic board.

Other characteristics of the door locking assembly according to the invention are:

- said electronic energy-storage component is a supercapacitor;
- said back-up electrical power supply means include at least two electronic energy-storage components mounted in series;
- said back-up electrical power supply means include at least two groups of electronic energy-storage components, the electronic components of a given group being mounted in series and the two or more groups being mounted in parallel;
- said back-up electrical power supply means include at least one pair of electronic energy-storage components mounted in parallel;
- said back-up electrical power supply means include at least two pairs of electronic energy-storage components mounted in series;
- said electronic energy-storage component has an energy density between 0.4 and 10 Wh/kg;
- said electronic energy-storage component has a maximum charging or discharging current between 1 and 10 Amp for a voltage between 0.8 and 14 V;
- said electronic board includes memorization means which can be electrically supplied by said electronic energy-storage component and in which is stored software designed to test the correct operation of said lock module.

Another object of the invention is a process for testing correct operation of said lock module, this test being performed before electrical connection of said lock module to said main electrical power supply means and after electrical charging of said electronic energy-storage component, said test process using software stored in memorization means electrically supplied by said electronic energy-storage component.

BRIEF DESCRIPTION OF THE DRAWINGS

The invention will be better understood on the reading the following description of a preferred embodiment, taken only as a non-limitative example, making reference to the attached drawings of which.

DETAILED DESCRIPTION OF A PREFERRED EMBODIMENT

Figure 1:
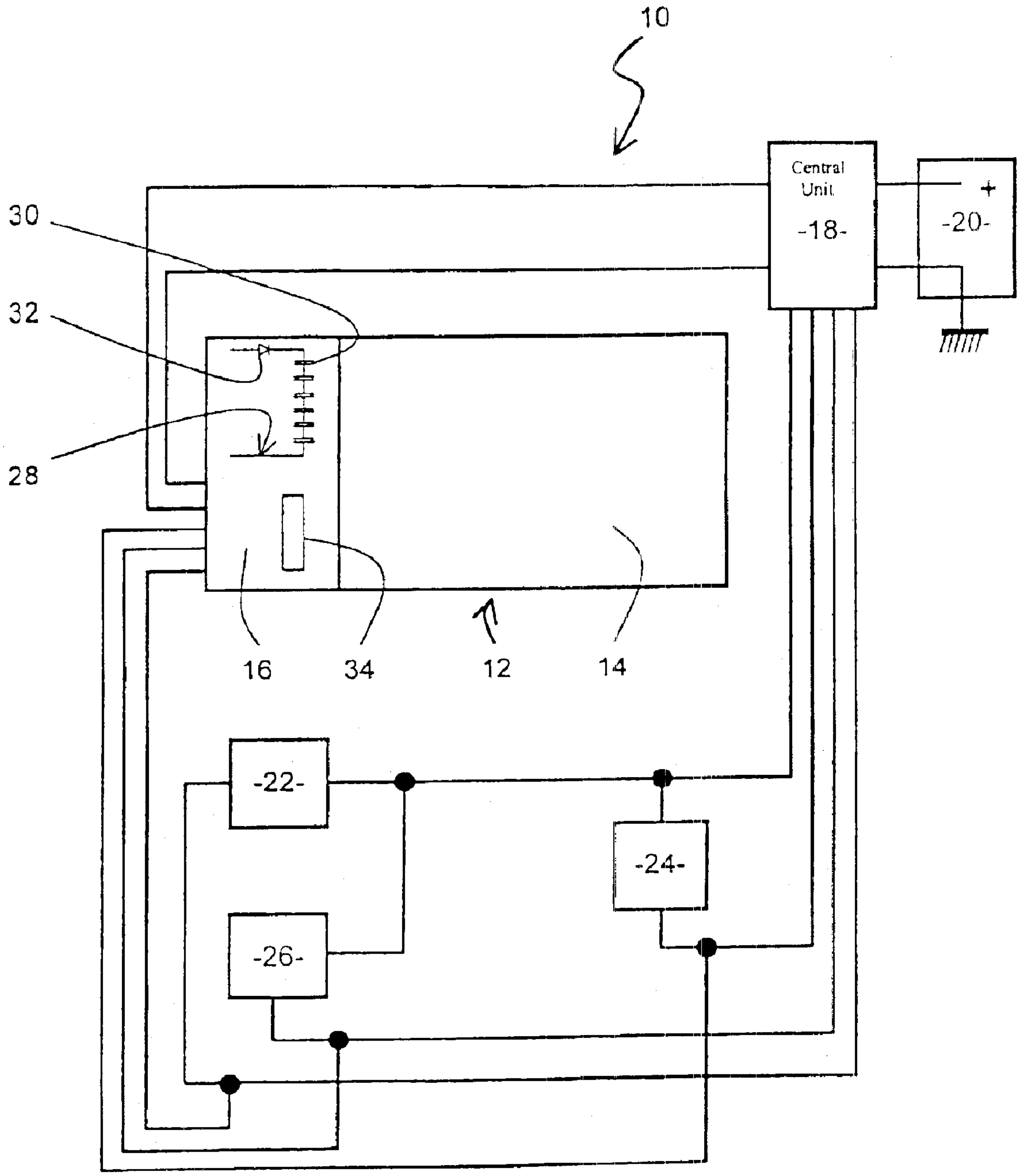
FIG. 1 is a block diagram of an automobile vehicle electrical installation used for locking one of the vehicle's doors incorporating a door locking assembly according to the invention.

FIG. 1 shows an automobile vehicle electrical installation 10 used for locking a door of this vehicle.

This installation 10 includes a door locking assembly 12 intended to be fitted in a door of the vehicle.

The assembly 12 includes a classic electric lock module 14 incorporating an electronic board 16 providing an interface connecting this lock module 14 to main electrical power supply means and to means of control of the lock module.

The main electrical power supply means include a classic centralized electrical unit 18 connected electrically to a main battery 20 of the vehicle. If need be, this main battery 20 can be backed up by a secondary (back-up) battery (not shown) that takes over in the event of a malfunction of the main battery.

The control means of the lock module include an outside door handle 22, an inside door handle 24 and, in the case of a front door for example, an electronic barrel 26. These parts 22, 24, 26 include classic electrical switches whose states of opening and/or locking/unlocking are fed to the central unit 18 and the electronic board 16.

The assembly 12 also includes back-up electrical power supply means 28 for the lock module 14 that are used in the event of malfunction of the main power supply means 18, 20. These back-up means 28 include at least one electronic energy-storage component, preferably a supercapacitor 30, mounted on the electronic board 16.

The supercapacitor 30 has an energy density between 0.4 and 10 Wh/kg and a maximum charging or discharging current between 1 and 10 A for a voltage between 0.8 and 14 V. The capacity of the supercapacitor 30 can be 4 to 8 F or even greater.

The supercapacitor 30 constitutes a rechargeable and compact energy source.

To assure the voltage and current necessary to activate the lock module (for example 12 V and 3 A), the back-up means 28 preferably include several supercapacitors 30 mounted in series or in parallel.

Figure 2:
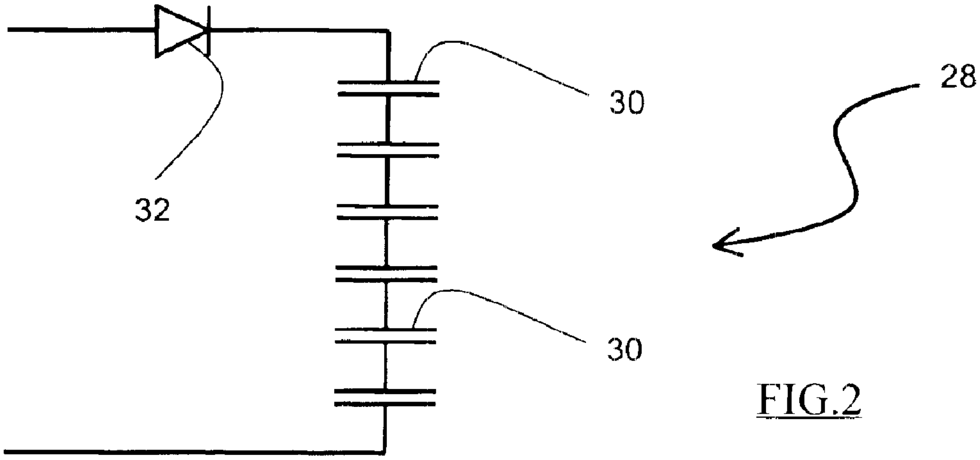
FIGS. 2 to 4 are circuit diagrams showing three different embodiments of the back-up power supply means of the locking assembly in FIG. 1.

The back-up power supply means 28 according to this first embodiment of the invention illustrated in FIGS. 1 and 2 include at least two supercapacitors 30. In these figures, we see, by way of example, six supercapacitors 30 mounted in series.

Figure 3:
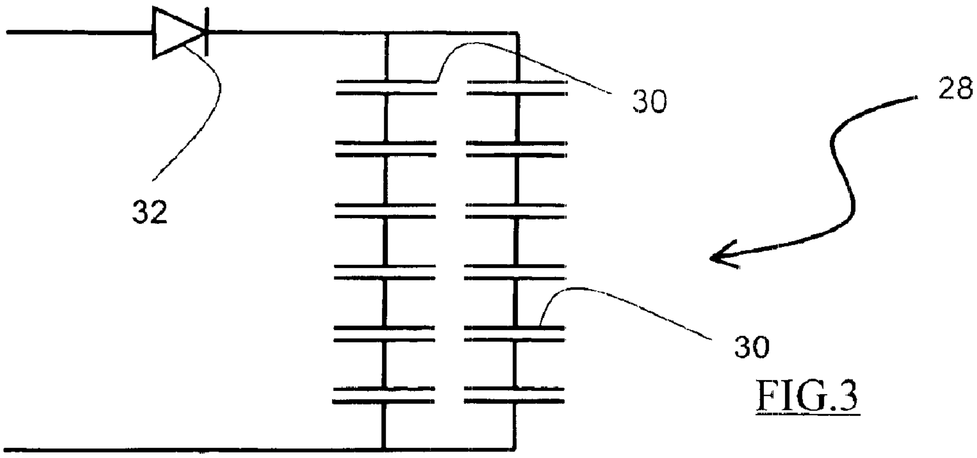
Figure 4:
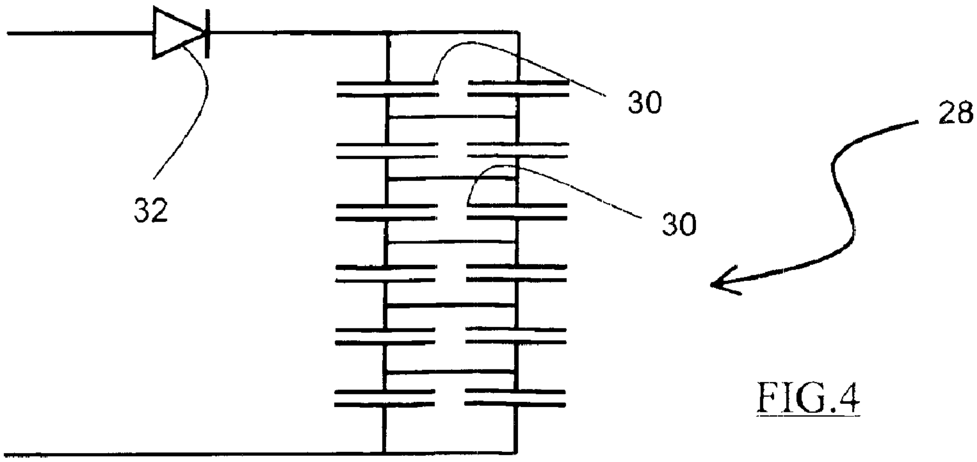

Two variants of the back-up power supply means 28 are shown in FIGS. 3 and 4. These two embodiments increase the reliability of these back-up means.

The back-up power supply means 28 according to the embodiment illustrated in FIG. 3 include at least two groups of supercapacitors 30. In the example shown each group comprises six supercapacitors 30; the supercapacitors 30 of a given group are mounted in series; the two (or more) groups are mounted in parallel. In this configuration, a malfunction of a supercapacitor 30 in one group does not prevent operation of the other group(s) of supercapacitors.

The back-up power supply means 28 according to the embodiment illustrated in FIG. 4 include at least one pair of supercapacitors 30 mounted in parallel. In the example shown there are six pairs of supercapacitors 30; these pairs are preferably mounted in series. In this configuration, a malfunction of one of the supercapacitor 30 does not prevent operation of the other supercapacitors.

A diode 32 or similar component prevents discharge of the supercapacitors 30 into the main power supply means 18, 20.

The supercapacitors 30 are mounted directly on the electronic board 16, for example using classic soldering techniques applicable to insertion-mount (through-hole) components or surface-mounted components. This avoids the various risks (short-circuit, disconnection, oxidation, variation of resistance, etc.) associated with the use of connection means between the electronic board and the back-up battery according to the state of the art described in EP-A-0 694 664.

During normal use of the vehicle, the back-up power supply means 28 are not used as long as the main power supply means 18, 20 are operating normally. The latter keep the supercapacitors 30 permanently charged.

We note that the time needed to charge a supercapacitor 30 is relatively short: from a few tenths of a second to a few tens of seconds.

When, following an accident of the vehicle or any kind of malfunction of the installation 10, preventing the battery 20 or the unit 18 from supplying the lock module 14 with the energy it needs to open or close the lock, the electronic board 16 automatically switches to the back-up power supply means 28 using known techniques.

The electronic board 16 can warn the user of this switch-over by activating an alarm indicator light on the vehicle door or the dashboard or by displaying an alarm message on the vehicle's computer screen.

The back-up power supply means 28 based on supercapacitors can store sufficient energy for several opening/closing cycles of the lock module 14, even as many as ten cycles with certain types of lock.

Advantageously, the electronic board 16 includes memorisation means 34 which can be electrically supplied by the back-up power supply means 28 and in which is stored software designed to test the correct operation of the lock module 14.

Such memorisation means can include a classic programmable memory of EEPROM type (Electrically Erasable and Programmable Read Only Memory).

In this manner, the operation of the lock module 14 can be tested its electric connection to the main electrical power supply means 18, 20 and after electrical charging of the supercapacitors. This charging can be performed at the same time as the fitting of the various parts in the door, but before definitive mounting of this door on the vehicle.

The test is performed automatically using software programmed in the EEPROM memory whose electrical supply is provided by the supercapacitors.

Among the advantages of the invention, we note that it enhances the reliability of the back-up power supply means incorporated in the electric lock module, while enabling these back-up power supply means to deliver a relatively large current.

What is claimed is:

1. Automobile vehicle door locking assembly fitted in a vehicle door, including an electric lock module (14) incorporating an electronic board (16) providing an interface connecting said lock module (14) to main electrical power supply means (18, 20) and to means (22 to 26) of control of said lock module (14), and back-up electrical power supply means (28) to supply said lock module (14) in the event of a malfunction of said main electrical power supply means (18, 20), wherein said back-up electrical power supply means (28) include at least one electronic energy-storage component (30) mounted on said electronic board (16), wherein said electronic energy-storage component (30) is permanently loaded by said main electrical power supply means in normal use, and wherein said electronic energy-storage component (30) is a supercapacitor.

2. Door locking assembly according to claim 1, wherein said back-up electrical power supply means (28) include at least two electronic energy-storage components (30) mounted in series.

3. Door locking assembly according to claim 1, wherein said back-up electrical power supply means (28) include at least two groups of electronic energy-storage components (30), the electronic components of a given group being mounted in series and the two or more groups being mounted in parallel.

4. Door locking assembly according to claim 1, wherein said back-up electrical power supply means (28) include at least one pair of electronic energy-storage components (30) mounted in parallel.

5. Door locking assembly according to claim 1, wherein said back-up electrical power supply means (28) include at least two pairs of electronic energy-storage components (30), these pairs being mounted in series.

6. Door locking assembly according to claim 1, wherein said electronic energy-storage components (30) have an energy density between 0.4 and 10 Wh/kg.

7. Door locking assembly according to claim 1, wherein said electronic energy-storage components (30) have a maximum charging or discharging current between 1 and 10 A for a voltage between 0.8 and 14 V.

8. Door locking assembly according to claim 1, wherein said electronic board (16) includes memorization means (34) which can be electrically supplied by said electronic energy-storage components (30) and in which is stored software designed to test the correct operation of said lock module (14).

9. Process for testing correct operation of a vehicle door locking assembly fitted in a vehicle door and including an electric lock module (14) incorporating an electronic board (16) providing an interface connecting said lock module (14) to main electrical power supply means (18, 20) and to means (22 to 26) of control of said lock module (14), and back-up electrical power supply means (28) to supply said lock module (14) in the event of a malfunction of said main electrical power supply means (18, 20), wherein said back-up electrical power supply means (28) include at least one electronic energy-storage component (30) mounted on said electronic board (16), wherein said electronic energy-storage component (30) is permanently loaded by said main electrical power supply means in normal use, and wherein said electronic energy-storage component (30) is a supercapacitor, said process characterized in that the test is performed before electrical connection of said lock module (14) to said main electrical power supply means (18, 20) and after electrical charging of said electronic energy-storage component (30), said test process using software stored in memorization means (34) electrically supplied by said electronic energy-storage component (30).

* * * * *